June 28, 1960  C. WANTZ ET AL  2,943,177
THERMOSTATIC SWITCH
Filed Dec. 19, 1958  5 Sheets-Sheet 5
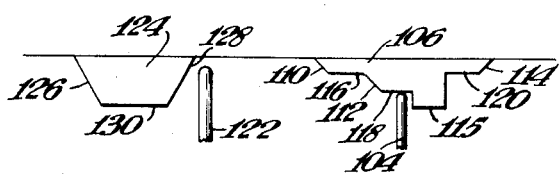
Fig. 9.  BROIL POSITION
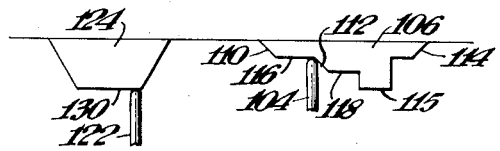
Fig. 8.  INTERMEDIATE BAKE & BROIL POSITIONS
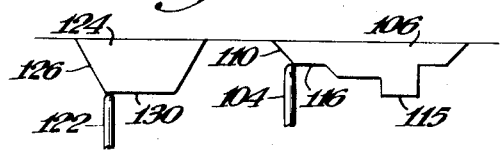
Fig. 7.  MOVED FROM BAKE POSITION
Fig. 6.  BAKE POSITION
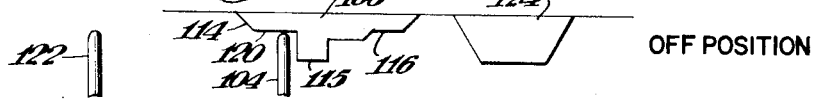
Fig. 5.  OFF POSITION

United States Patent Office 2,943,177
Patented June 28, 1960

2,943,177
THERMOSTATIC SWITCH

Clarence Wantz, Greensburg, and Russell F. Garner, Youngwood, Pa., assignors to Robertshaw-Fulton Controls Company, Richmond, Va., a corporation of Delaware Filed Dec. 19, 1958, Ser. No. 781,698

2 Claims. (Cl. 219—20)

This invention relates generally to thermostatic control switches and more particularly to control switches for electrically heated ovens provided with baking and broiling elements.

An object of this invention is to de-activate all current carrying switch parts when the switch is in an "off" position.

Another object of this invention is to facilitate assembly and disassembly of a switch by mounting some of the switch parts exteriorly of the casing.

Still another object of this invention is to actuate switch mechanisms located exteriorly of and interiorly of a switch casing by means located exteriorly of the switch casing.

A further object of this invention is to actuate a switch located exteriorly of a switch casing by means located within the switch casing.

In the preferred embodiment of this device, a thermally responsive switch means is disposed within a casing for energizing a heating circuit from source of electric power. Rotatable means are provided on the casing for adjusting the temperature to which the switch means will be responsive. Switching apparatus movable between positions is also mounted on the casing for controlling the heating circuit energized by the switch means and means disposed within the switch casing are operated by the rotatable means for moving the switching apparatus between controlling positions.

Other objects and advantages will become apparent from the following description of the preferred embodiment of the invention taken in connection with the following drawings wherein:

Figs. 5, 6, 7, 8, and 9 are schematic developments of a detail showing various parts of the device in different operating positions.

Figure 1:
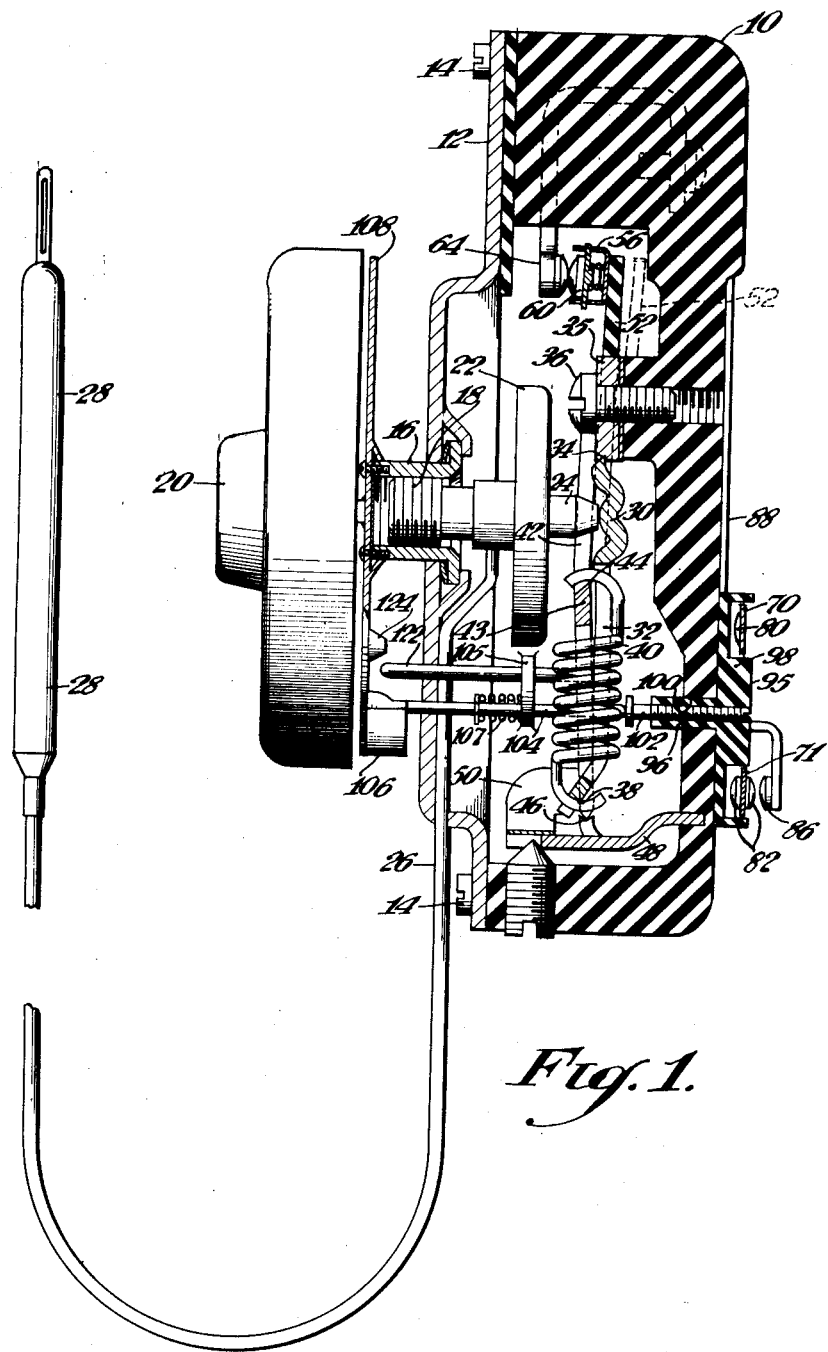
Fig. 1 is a sectional view of the control switch of the present invention taken on line I—I of Fig. 2.
Figure 2:
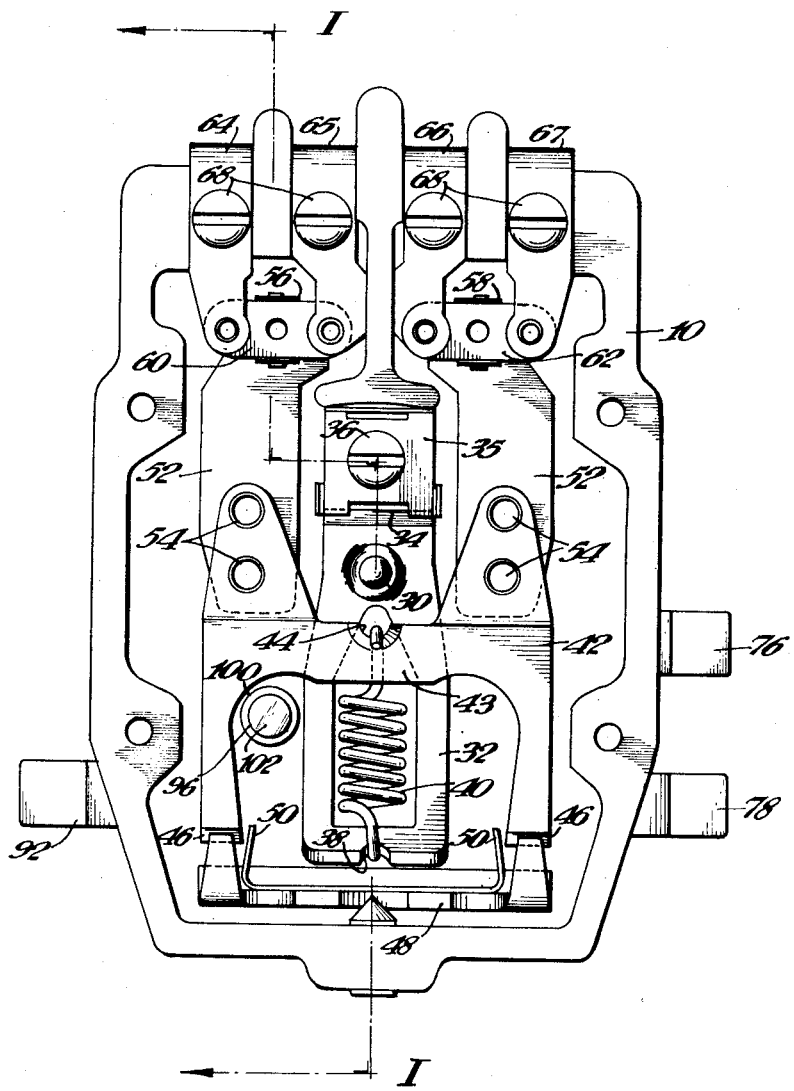
Fig. 2 is a front elevation view with the cover of the switch removed to illustrate the interior mechanism.
Figure 3:
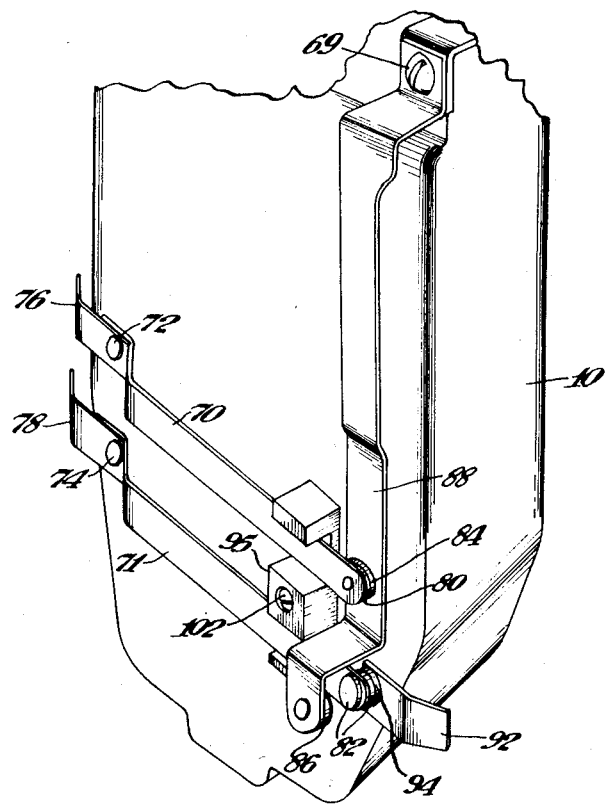
Fig. 3 is a rear view in perspective illustrating the exterior switching mechanism.

Referring to Figs. 1 through 3, there is shown a generally cup-shaped housing or casing 10 with a cover 12 secured to the open end thereof by suitable machine screws 14. An internally threaded rotatable hub 16 is journalled centrally of cover 12 and is adapted to receive a control rod in the form of an adjusting screw 18. The exterior end of hub 16 may be of a reduced diameter and adapted to carry the usual type of control knob 20 by means of which the adjusting screw 18 may be moved axially.

An expansible and contractible diaphragm element 22 is carried on the interior end of adjusting screw 18 and has a thrust button 24 projecting from the forward end thereof. The arrangement of diaphragm element 22, adjusting screw 18 and thrust button 24 is such that upon rotation of knob 20, the diaphragm 22 and button 24 will be moved axially. One end of a capillary tube 26 communicates with the interior of diaphragm 22 while its other end extends exteriorly of the housing 10 for communication with the usual bulb element 28 which is appropriately positioned in a medium to be controlled thermostatically. As is well known in the art, the diaphragm 22, capillary tube 26, and bulb 28 form a temperature responsive means which is a closed system containing an expansible fluid whereby temperature variations sensed by bulb 28 cause axial movement of thrust button 24.

Button 24 abuts the face of a depression 30 formed in actuating lever 32 of a snap-action mechanism. Lever 32 is of generally elongated form and is provided at one end with a knife edge 34 which is cooperable with a V-shaped bearing groove in a bracket 35, suitably secured within the casing 10 by a machine screw 36. The opposite end of lever 32 is also provided with a knife edge 38 around which one end of a coil spring 40 is hooked.

A control lever 42 of generally H-shaped configuration is provided with a knife edge 44 formed in the center bar 43 thereof for receiving the opposite hooked end of the coil 40. The extremities of the lower legs of control lever 42 are each provided with a knife edge 46 for cooperation with suitable bearings formed on an adjustable bridge element 48 which is suitably supported within the casing 10. Bridge element 48 is formed with a pair of adjusting leg members 50 which are juxtaposed the lower legs of control lever 42 to prevent knife edges 46, 46 from disengaging the bearings formed on bridge element 48.

An insulating plate 52 is secured to each of the upper legs of control lever 42 by any suitable means, such as rivets 54. Extending from the front of each of the insulating plates 52 is a U-shaped contact bridge holder 56, 58. Bridge holders 56, 58 have a pair of opposed slots formed in the legs thereof for slidably receiving contact bridges 60, 62, respectively. A coil spring is compressed between the contact bridges 60, 62 and the bottom of the holders 56, 58, respectively, to exert a biasing force on the contact bridges 60, 62 and thus minimize contact bounce. Contact bridges 60, 62 are each cooperable with a pair of fixed contacts 64, 65, and 66, 67, respectively. Each of the fixed contacts 64, 65, 66, and 67 is of generally U-shaped configuration and extends outwardly of the casing 10 to form electrical terminals. Contacts 64, 65, 66, and 67 may be suitably secured to the casing 10 by machine screws 68 and may be further provided with machine screws 69 at the outwardly extending ends thereof for connecting the switch of this invention to a suitable three-wire 240/120 volt A.C. supply.

As best illustrated in Fig. 3, a pair of flexible switch arms 70, 71 are secured at one of their respective ends to the exterior surface of casing 10 by suitable means, such as rivets 72 and 74, respectively. Rivets 72, 74 secure electrical connectors 76, 78 to switch arms 70, 71, respectively. The switch arms 70, 71 are disposed in substantially parallel spaced relationship and are formed of a flexible electrical conducting material so as to be normally biased to the left as viewed in Fig. 1. The free ends of switch arms 70, 71 are provided with contacts 80, 82, respectively, which are adapted to cooperate with stationary contacts 84, 86, respectively, provided on an electrical conducting terminal strip 88.

Terminal strip 88 is shown disposed substantially perpendicular to the length of switch arms 70, 71 and with one end thereof suitably secured to stationary contact 64, as by the machine screw 69. The terminal strip 88 is formed with a first portion of its length disposed to underlie the switch arm 70 and with a second portion of its length disposed to overlie the switch arm 71. Contact 84 is secured to terminal strip 88 on the portion thereof which underlies switch arm 70 so as to be engaged by contact 80 when switch arm 70 is moved downwardly, and may further be in the form of a rivet for securing terminal strip 88 to the casing 10 intermediate its length. Contact 86 is secured to terminal strip 88 adjacent the free end thereof on the portion thereof which overlies switch arm 71 and is disposed to engage contact 82 when switch arm 71 is moved upwardly.

A contact 94 is disposed to engage contact 82 when switch arm 71 is moved downwardly and may be in the form of a rivet for securing terminal strip 92 to the casing 10.

As is apparent from Fig. 3, contacts 80 and 82 will normally engage contacts 84 and 94, respectively, due to the inherent bias of the switch arms 70 and 71. Means are provided for moving flexible switch arms 70 and 71 upwardly to open contacts 80, 84 and 82, 94, and to further close contacts 82, 86. To this end, an actuating member 95 is provided intermediate the switch arms 70, 71 and the casing 10. Actuating member 95 is formed with a shank portion 96 having one end integrated with the medial portion of cross member 98 and having the other end thereof disposed for sliding movement in a suitable aperture 100 provided in the casing 10. Suitable recessed portions are formed in the ends of cross member 98 and are adapted to receive the switch arms 70 and 71. A machine screw 102 may be provided in the free end of shank portion 96, internally of the casing 10, for the purpose of adjusting the amount of movement of switch arms 70 and 71 and to further provide a wear-resistant surface for the free end portion of shank 96.

Switch arms 70, 71 may be enclosed by a suitable cover, not shown, which may be secured to the casing 10 by suitable means, such as a nut, not shown, adapted to engage stud 36, which may be extended outwardly of the casing 10 for this purpose.

Means are provided for moving actuating member 95 and switch arms 70 and 71 between positions and takes the form of a plunger 104 having one end projecting outwardly of the casing 10 through a suitable aperture provided in the cover 12 and having another end in operative engagement with the head of machine screw 102. A bearing 105 is provided within the casing 10 to guide the movement of plunger 104 relative to machine screw 102. Spring means 107 operatively engage plunger 104 for biasing the same for movement outwardly of the cover 12.

Means for operating plunger 104 at an appropriate angle of rotation of knob 20 is provided by a cam element 106 made integral with one surface of a circular disc element 108 which may be suitably secured to the hub 16 for rotation therewith. The cam element 106 upon hub 16 so as to operate the plunger 104 when the knob 20 is rotated either to the usual "broil" position, preferably beyond the range of temperature settings used in baking, or the "off" position, which is below the range of temperature settings used in baking.

Cam element 106 is provided with a plurality of sloping cam surfaces 110, 112, and 114 which are disposed at an angle to the axis of the plunger 104. Thus, lateral movement of the cam element 106 upon rotation of the knob 20, when the plunger 104 is in engagement with either of the cam surfaces 110, 112, or 114, will result in axial movement of the plunger 104 against the bias of spring 107. An abutment member 115, located intermediate the edges of cam element 106 and having edge portions which are disposed substantially parallel to the axis of the plunger 104 and adapted to engage a portion of the length thereof, limits rotation of knob 20 in either direction.

A plurality of cam surfaces 116, 118, and 120 are provided on the cam element 106 and are disposed normal to the axis of hub 16 and spaced from the surface of disc element 108. Cam surfaces 116 and 120 are disposed at the same distance from the surface of disc element 108 and correspond respectively to the "off" position and a position intermediate the "bake" and "broil" positions of the knob 20. Cam surfaces 116 and 120 further correspond to an inactive position of switch arms 70, 71, wherein switch arms 70, 71 are positioned to disengage their respective contacts 80, 82 from any of the stationary contacts 84, 86, 94 with which they cooperate. As illustrated in Figs. 4 through 7, cam surface 116 is disposed between the uppermost edge of cam surface 110 and the lowermost edge of cam surface 112 and cam surface 120 is disposed between the uppermost edge of cam surface 114 and one of the edge portions of abutment member 115.

Cam surface 118, disposed between the uppermost portion of cam surface 112 and another edge portion of abutment member 115, corresponds to the "broil" position of the knob 20 and a position of switch arm 71 wherein contact 82 is in engagement with the stationary contact 86 carried by the terminal strip 88.

To prevent arcing at the contacts 80, 84; 82, 86 and 82, 94, manually operable means is provided for breaking the energizing circuit thereto when the switch arms 70, 71 are being moved between their controlling positions. This means takes the form of a plunger 122 which projects through the cover 12 and through the bearing 105 into engagement with the actuating lever 32 of the snap-action mechanism. Means for operating the plunger 122 at an appropriate angle of rotation of the knob 20 is provided by cam element 124 carried by the disc element 108.

The cam element 124 includes a pair of opposed cam surfaces 126, 128, each disposed at an angle to the axis of the plunger 122 and separated by a third cam surface 130, disposed normal to the axis of hub 16 and spaced from the surface of disc element 108. Cam element 124 is so disposed relative to cam element 106 that the plunger 122 will be forced inwardly of the casing 10 to move the actuating lever 32 of the snap-action mechanism about its pivot 34 and cause the main control lever 42 to snap overcenter to the broken line position shown in Fig. 1, thereby breaking contacts 58, 66, 67 and 56, 64, 65, whenever the switch arms 70, 71 are being moved between controlling positions. This operation is best illustrated in Figs. 5, 6, and 7 and will be more fully described hereinafter with regard to the operation of the switch of this invention.

Figure 4:
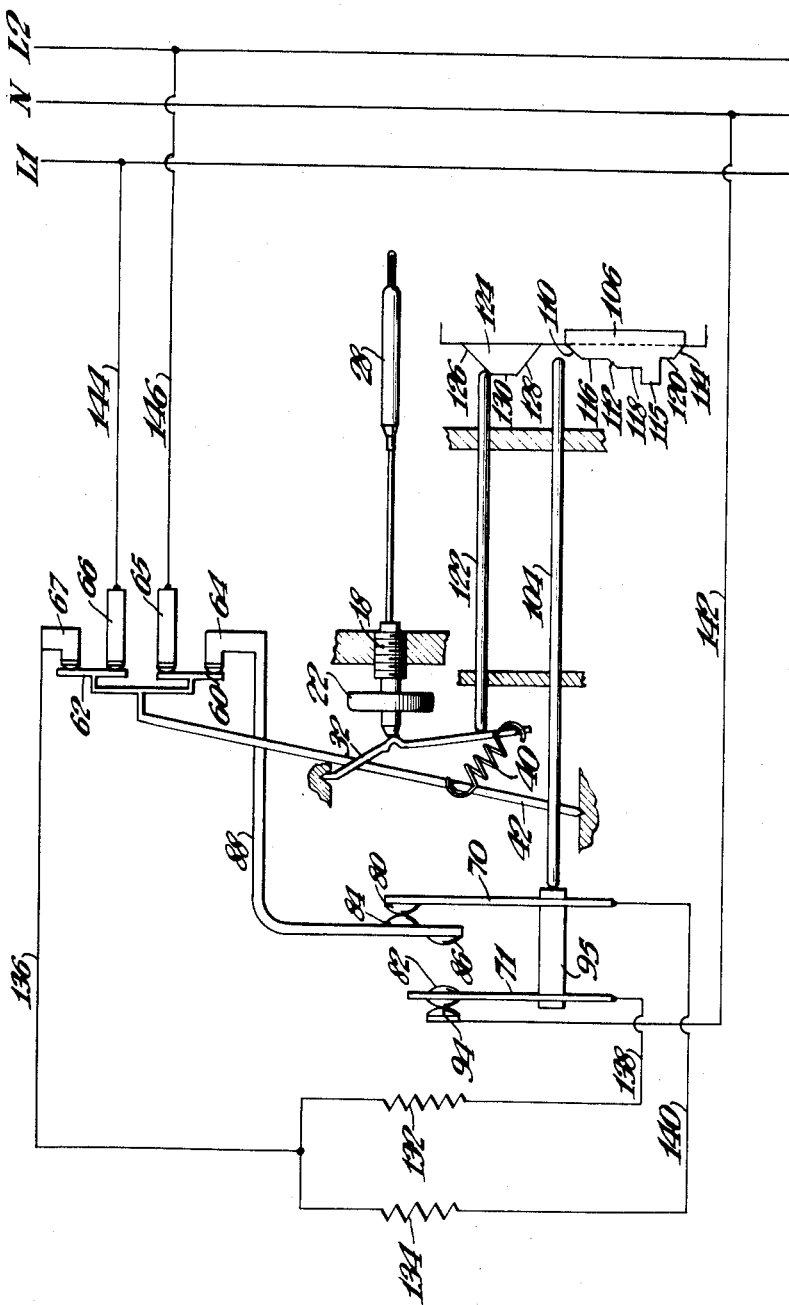
Fig. 4 is a schematic view of the switch of Figs. 1–3 and the electrical connections thereto.

Referring more particularly to Fig. 4, the switch of this invention is shown as being connected to a conventional type of "bake" and "broil" elements 134, 132, respectively, which may be disposed in an oven or other heated chamber. One of the respective ends of the "bake" and "broil" elements 134, 132 may be connected together and to the terminal 67 by a wire 136. The other end of "bake" element 134 may be connected to connector 76 and accordingly to the switch arm 70 by a wire 140, while the other end of "broil" element 132 may be connected to connector 78 and thus to switch arm 71 by a wire 138. Contact 94 may be connected to the neutral wire of the three-wire 120/240 volt a.c. source by a wire 142 connected to the connector 92. Terminals 65 and 66 may be connected to the outside line wires L2, L1, respectively, of the three-wire source of power by wires 146 and 144, respectively.

In the operation of this device, sensing bulb 28 will be disposed in an oven or other heated chamber to be heated by the "broil" and/or "bake" elements 132, 134. When the dial 20 is in the usual "off" position, the adjusting screw 18 is in an innermost position and the button 24 will cause the snap-action mechanism to hold the control lever 42 in the broken line position shown in Fig. 1 with the contact bridges 60, 62 held in an open position relative to contacts 64, 65, 66, and 67. Plunger 104 is further held in an inward position by the cam surface 120 on cam element 106 as best shown in Fig. 5, thereby holding the switch arms 70, 71 in a position wherein contacts 80, 82, carried thereby, do not engage any of the contacts 84, 86, and 94 cooperable therewith.

When the knob 20 is rotated in the usual clockwise direction to any temperature setting except the "broil" position, then the adjusting screw 18 of the diaphragm 22 will be moved away from the actuating lever 32 of the snap-action mechanism allowing the control lever 42 to snap to the full line position shown in Fig. 1 to close contact bridges 60, 62 upon the stationary contacts 64, 65, 66, and 67. Simultaneously, cam element 106 is moved to disengage cam surfaces 114 and 120 from the plunger 104 thus allowing spring 107 to move plunger 104 outwardly of the cover 12.

When plunger 104 moves outwardly of the cover 12, insulating member 95 is caused to move inwardly of the casing 10 by the inherent bias of switch arms 70, 71 to close contacts 80 and 82 upon contacts 84 and 94, respectively. Thereafter, cam elements 106, 124 assume the position shown in Fig. 6 relative to plungers 104 and 122.

Current will thus flow to the "broil" element 132 by way of a circuit which may be traced from line wire L1 through wire 144, stationary contact 66, contact bridge element 62, stationary contact 67, wire 136, "broil" element 132, wire 138, switch arm 71, contact 82, contact 94, and through wire 142 to the line wire N of the three-wire source of power. The "broil" element 132 is thus connected across the three-wire source of power at a reduced voltage.

Simultaneously with the energization of the "broil" element 132, "bake" element 134 is also connected to the three-wire source of power to be energized at full voltage. The circuit for energizing "bake" element 134 may be traced from line wire L2 through wire 146, stationary contact 65, contact bridge 60, stationary contact 64, terminal strip 88, contact 84, contact 80, switch arm 70, wire 140, "bake" element 134, wire 136, stationary contact 67, contact bridge 62, stationary contact 66, and through wire 144 to terminal L1 of the three-wire source of power.

When diaphragm 22 expands at the predetermined temperature as set by the knob 20, it will force the actuating lever 32 to the right, as viewed in Fig. 1, thereby causing the control lever 42 to snap to the broken line position of Fig. 1. Consequently, the circuits previously traced are broken by the control switch and will remain broken until the diaphragm 22 again contracts to allow the actuating lever 32 to move to the left as viewed in Fig. 1 and repeat the prior operation.

When knob 20 is rotated in the usual clockwise direction from any of the preselected baking temperatures toward the usual "broil" position, cam element 124 engages plunger 122, as shown in Fig. 7, to move the control lever 42 to the broken line position shown in Fig. 1 and thereby prevent the energization of either the "bake" or the "broil" elements 132, 134. As soon as control lever 42 moves to the broken line position of Fig. 1, cam surface 110 engages plunger 104 and begins to move switch arms 70, 71 to disengage contacts 80, 82 from contacts 84, 94, respectively.

Upon continued clockwise rotation of the knob 20, it will be apparent from Fig. 8, that plunger 122 engages cam surface 130 during the entire period that plunger 104 engages cam surfaces 116 and 112. Accordingly, the energizing circuit for "bake" and "broil" elements 134 and 132, as controlled by contacts 67, 66, and 65, 60, 64, remains broken during the entire period that switch arms 70, 71 are being moved between controlling positions.

As plunger 104 moves up cam surface 112 to close contact 82 upon contact 86, a plunger 122 moves down cam surface 128, thus allowing control lever 42 to resume the full line position of Fig. 1. It is now apparent that current will flow to the "broil" element 132 by way of a circuit which may be traced from line wire L1 through wire 144, stationary contact 66, contact bridge 62, stationary contact 67, wire 136, "broil" element 132, wire 138, switch arm 71, contact 82, contact 86, terminal strip 88, stationary contact 64, contact bridge 60, stationary contact 65, and through wire 146 to line wire L2. Thus, "broil" element 132 is connected across the three-wire source of power at a full voltage when plungers 104, 122 assume the positions shown in Fig. 9.

When "broil" element 132 is energized at full voltage, it will be apparent that "bake" element 134 remains de-energized because contacts 80, 84 remain in an open position due to the movement of switch arm 70 by the plunger 104.

Upon counterclockwise rotation of the knob 20 to the "off" position, the cam element 124 and plunger 122 will first act upon the snap-action mechanism to move the control lever 42 to the broken line position of Fig. 1 with the plunger 104 thereafter moving out of engagement with the cam element 106 to permit switch arms 70, 71 to return to their initial or biased positions. As the plunger 122 disengages cam element 124, control lever 42 returns to its full line position of Fig. 1 to re-energize the "bake" and "broil" elements 134, 132 at full and reduced voltage, respectively, as described above. However, further rotation of the knob 20 toward the "off" position will cause the adjusting screw 18 and diaphragm 22 to move toward the snap-action mechanism through a sufficient distance to actuate the same and cause the control lever 42 to assume the broken line position of Fig. 1.

Thus, the contact bridges 60, 62 will be open relative to the stationary contacts and no current will flow to either the "bake" or "broil" elements 134, 132. Moreover, plunger 104 will at this time be engaged by cam element 106 and will thus be actuated inwardly of the cover 12 by the cam surfaces 114, 120 to assume the position of Fig. 5 wherein contacts 80, 82, carried by switch arms 70, 71, disengage all of the contacts 84, 86, 94 cooperable therewith.

It will be apparent that in the "off" position of the knob 20 that all circuits to the "bake" and "broil" elements 134, 132 are broken to prevent any possible energization thereof. Moreover, since the switch arms 70, 71 carry no electric current when they are being moved between positions, no damage may occur to the contacts carried thereby.

It should be particularly pointed out that this thermostatic switch is versatile in application. The switch arms 70, 71 and terminal strip 88 may be rearranged or adapted for performing other operations than the control of the "bake" and "broil" elements as described. Moreover, additional terminal strips and switch arms may be added to the back cover of this thermostatic switch to perform additional controlling operations through actuation by the control knob 20. As a result of this arrangement, it is apparent that the casing 10, cover 12, and internal mechanism of the switch may remain unchanged and yet the switch may be adapted for a multitude of controlling operations. The time-saving value of such an arrangement in the inspection, calibration, adjustment, manufacturing, and stocking of parts will be particularly appreciated by those who employ volume production in their plants.

Although only a specific embodiment of the invention has been shown and described, it will be apparent that many modifications may be made by those skilled in the art. Such modifications may be made in the details of construction and arrangements of parts without departing from the scope of the invention as set forth in the appended claims.

We claim:

1. In a thermostatic switch the combination comprising a casing having apertured front and rear walls, switch means disposed within said casing and cycled thermostatically between open and closed positions for energizing a heating circuit, means mounted on the apertured front wall of said casing having a portion extending therethrough and being rotatable to selected positions for adjusting the temperature to which said switch means is responsive, a plurality of stationary contacts exteriorly mounted on the apertured rear wall of said casing, a plurality of movable switch arms exteriorly mounted on the apertured rear wall of said casing and cooperable with said stationary contacts for controlling the heating circuit energized by said switch means, actuating means for said switch arms including a shank portion slidably extending through the apertured rear wall into said casing, said actuating means effecting movement of said switch arms between a first position wherein at least a first and second of said switch arms engage a first and second of said contacts, a second position wherein said first or second switch arms engage a third of said stationary contacts, and an intermediate position wherein said plurality of switch arms disengage said plurality of stationary contacts, means operative by said rotatable means and operatively engageable with said shank portion within said casing for actuating said actuating means at selected positions of said adjusting means, and adjusting means carried by said shank portion to adjust the amount of movement of said switch arms.

2. In a thermostatic switch, the combination comprising a casing having apertured front and rear walls, switch means disposed within said casing and cycled thermostatically between open and closed positions for energizing a heating circuit, means mounted on the apertured front wall of said casing and movable between an off position and first and second heating positions for adjusting the temperature to which said switch means is responsive, switching apparatus exteriorly mounted on the apertured rear wall of said casing and operative between a plurality of positions for controlling the heating circuit energized by said switch means, an actuator for said switch apparatus including an internally threaded shank extending through the apertured rear wall of said casing, means operatively disposed within said casing and forming an operative connection between said movable means and said actuator for moving said switching apparatus to a first position when said movable means is in the off position, to a second position when said movable means is in the first heating position, and to a third position when said movable means is in the second heating position, an adjusting screw disposed in said threaded shank for adjusting the movement of said switching apparatus, and operator means disposed within said casing and actuated by said movable means for moving said switch means to the open position when said switching apparatus is being moved between the second and third positions.

References Cited in the file of this patent

UNITED STATES PATENTS

| | | |
|---|---|---|
| 2,385,434 | Weber | Sept. 25, 1945 |
| 2,541,314 | Weber et al. | Feb. 13, 1951 |
| 2,591,802 | Garner | Apr. 18, 1952 |
| 2,747,073 | Welch et al. | May 22, 1956 |
| 2,774,849 | Weber et al. | Dec. 18, 1956 |
| 2,786,990 | Garner | Mar. 26, 1957 |